United States Patent

Tulloch

[11] Patent Number: 5,433,053
[45] Date of Patent: Jul. 18, 1995

[54] BARBED TEE FASTENER

[75] Inventor: Vincent M. Tulloch, Granbury, Tex.

[73] Assignee: Bechtel Corporation, San Francisco, Calif.

[21] Appl. No.: 65,204

[22] Filed: May 20, 1993

[51] Int. Cl.6 .............................................. E04C 3/00
[52] U.S. Cl. ................................. 52/582.1; 52/582.2; 52/584.1; 52/410
[58] Field of Search ............... 52/584.1, 582.1, 582.2, 52/285.3, 410; 411/187, 188, 184, 399, 957, 396

[56] References Cited

U.S. PATENT DOCUMENTS

| D. 18,973 | 3/1889 | Soltmann | 411/396 |
|---|---|---|---|
| 365,427 | 6/1887 | Berge | 52/584.1 |
| 1,680,015 | 7/1928 | Davis . | |
| 1,893,481 | 1/1933 | Adams | 52/584.1 |
| 1,955,924 | 4/1934 | MacLean . | |
| 2,128,757 | 8/1938 | Olson . | |
| 2,229,892 | 1/1941 | Hosking . | |
| 2,341,777 | 2/1944 | Hensel | 52/612 |
| 2,795,305 | 6/1957 | Bagge | 52/584.1 |
| 3,019,887 | 2/1962 | Lowden . | |
| 3,270,610 | 9/1966 | Knowlton . | |
| 3,295,580 | 1/1967 | Waltermire . | |
| 3,712,357 | 1/1973 | Corbett . | |

FOREIGN PATENT DOCUMENTS

| 0573614 | 6/1924 | France | 52/584.1 |
|---|---|---|---|
| 0387611 | 1/1924 | Germany | 411/396 |
| 2120705 | 12/1971 | Germany | 52/582.1 |

Primary Examiner—Carl D. Friedman
Assistant Examiner—Winnie Yip
Attorney, Agent, or Firm—Townsend and Townsend Khourie and Crew

[57] ABSTRACT

A fastener for securing two sheets of material each comprises a binding bar having pointed barbs at each end of said binding bar, said barbs each directed substantially perpendicular to said binding bar; a stem fixably attached to said binding bar, means at said stem end to urge said barb ends into said material planar surface. The device is particularly effective to join fire barrier panels without requiring their removal.

14 Claims, 3 Drawing Sheets

BARBED TEE FASTENER

BACKGROUND OF THE INVENTION

This invention relates generally to a rigid apparatus and a method for its use in joining sheets of material at their edges. More specifically, the invention relates to a mechanical fastener effective to join panels of material at butt joints without destroying or removing the panels.

Many industrial facilities, particularly nuclear power plants, require the installation of fire barrier panels on cable trays. Often due to their wear and aging, and particularly during the course of a plant shut-down, the backfitting of butt joint panels of fire barrier material which have been previously installed on cable trays is necessary. Options available to persons carrying out such maintenance would ordinarily involve upgrading of panels during "backfitting" of the butt joint by tying with stainless steel wire loops. However, such a process would involve removal of one panel to gain access into the enclosure in order to feed the inserted end of the wire back out through the free panel. The stitch and tie method is depicted by FIG. 1 and FIG. 2. In carrying out a stitching and tying method, holes for the loops would need to be pre-drilled. Moreover, significant damage or destruction of panels removed is likely during such a maintenance procedure. The stitching method clearly has numerous drawbacks and disadvantages.

Bolts and plates having flat circular heads provided with spikes have been shown in the art, for example in U.S. Pat. No. 3,019,887, issued Feb. 6, 1962 to G. Lowden. The spikes provided in these devices are intended to prevent the plate or bolt from rotating once in place. The spikes of such prior devices are intended to facilitate the introduction and tightening of a nut or the like. Such devices are not useful in the present application, where one side of panels to be joined are inaccessible once the panels are placed in position. Nor are such prior devices operable in the environment in which the present invention is intended. Securing panels at butt-type joints is a problem to be separately addressed in the art, and has yet to find suitable solutions, prior to the present invention.

From the above it is seen that an improved device and method of securing sheet panels of material at their butt joints is desired.

SUMMARY OF THE INVENTION

In accordance with the present invention, a fastener for securing two sheets of material each of said sheets having a planar surface and an edge surface is provided. The fastener, in one embodiment comprises a binding bar having pointed barbs at each end of said binding bar, said barbs each directed away from said binding bar in a direction substantially perpendicular to said binding bar; a stem fixably attached to said binding bar at a first stem end and having a second stem end directed away from said binding bar in substantially the same direction that said barbs are directed; means at said second stem end functional to urge said barb ends into said material planar surface. In a preferred embodiment the fastener further comprises a washer positioned about said second stem end and a nut threadably mated to threads provided on said second stem end. The preferred nut and large washer embodiment in combination is effective in countering vertical misalignment of panels, as described in detail below.

The present invention also includes a method for using the fastener in the securing of panels, comprising the steps of removing a portion of material from the butt joint area of the panels to be joined, inserting the fastener of the present invention through the slot created by removal of material, rotating the fastener and thereafter applying a force to urge the barb ends into the surface of each of the panels to secure the panels in position. The preferred means for applying a force is to provide the fastener with a washer and threadably mated nut capable of being tightened against the panels.

DESCRIPTION OF SPECIFIC EMBODIMENTS

Figure 3:
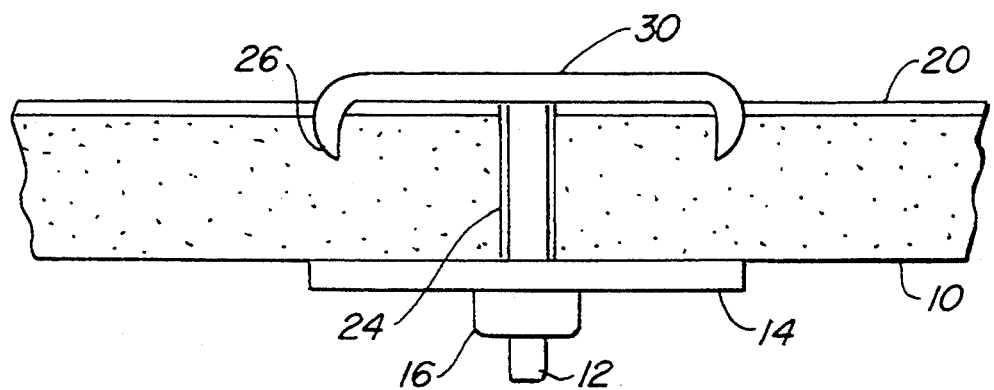
FIG. 3 is a cross-section of the embodiment comprising a nut and washer installed at a butt joint.

The invention will be described in particular embodiments, with reference to the Figures. FIG. 3 depicts a preferred embodiment wherein the device is a fastening assembly comprised of a stem 12 joined at a first stem end with a binding bar 30 to form a substantially perpendicular "tee" head. The bolt is a threaded rod with length determined by the thickness of the panels to be joined. The binding bar 30 preferably comprises a length of rigid steel, preferably small diameter wire, more preferably about 1/16" diameter steel wire. The binding bar 30 is preferably welded to the stem in this embodiment at the first stem end. The ends of the binding bar are formed down in a direction substantially perpendicular to the tee head to form barb ends 26. The barbs 26 are preferably sharpened to grip into the surface of material 20 being fastened.

Still referring to FIG. 3, a large washer 14, preferably a rectangular shaped washer is provided about stem 12. A threaded nut 16 is mated to threads provided on the second stem end. The threaded nut and washer cooperate to urge the washer 14 against the material surface 10 and further to urge binding bar against material surface 20 whereby barbs 26 pierce and sink into the panel material when the nut is tightened. For the particular application of fire panels in nuclear power plants, all components of the fastener are preferably fabricated of stainless steel.

In an alternate embodiment, the structure may be formed integrally, that is as one piece without the need for welding. The stem 12 and bar 30, including downwardly pointed barb ends 26, are cast in a single piece. This may afford in some instances a stronger fastener. It might also allow for the inclusion of more than one downwardly facing barb on each of the bar extensions. Such a plurality of barbs may in some cases be advantageous for securing panels, and may also minimize the number of fasteners required at a given joint of panels.

Figure 1:
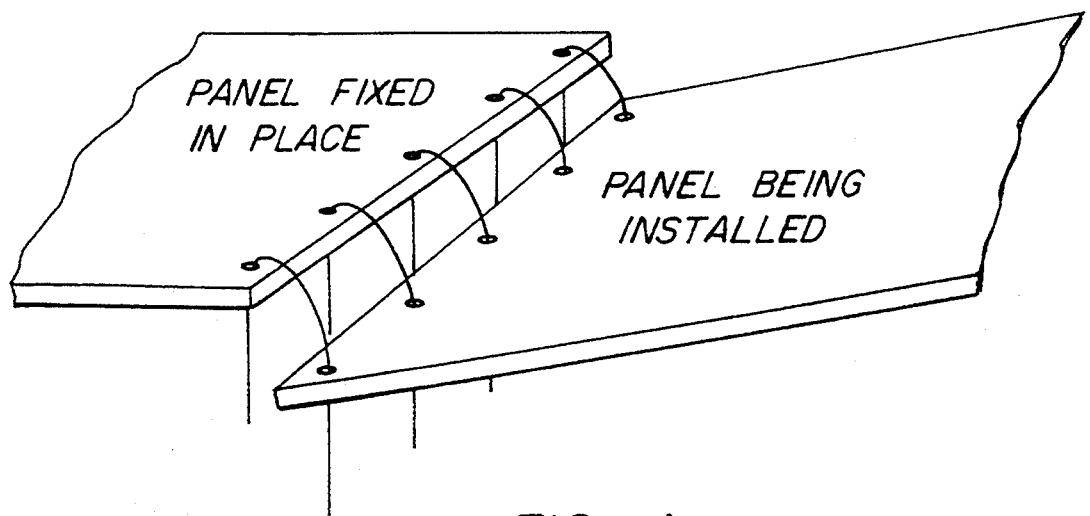
FIG. 1 and FIG. 2 depict the "stitch and tie" method used to secure panels prior to the present invention.
Figure 2:
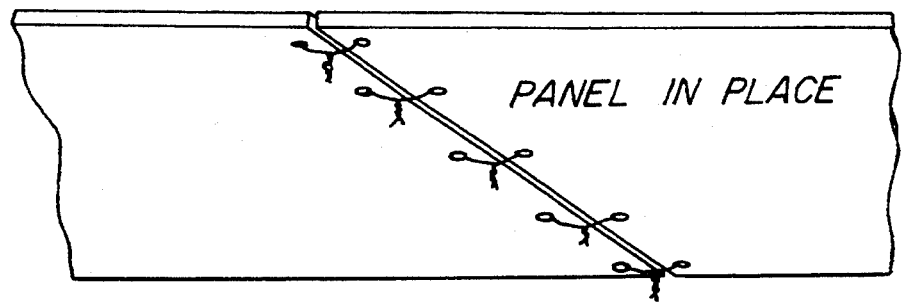

One preferred environment for use of the fastener is at the butt joints of fire barrier panels installed on cable trays. The interior surface of such panels typically has a sturdy wire mesh fabric bonded to it, depicted in FIG. 1 as surface 20. One advantage of the fastener of the present invention in this environment is the ability of the barb ends 26 to easily pierce the mesh fabric and thereafter be held in place. The fastener of this invention provides for simplicity of installation. Panels are secured without requiring the removal and probable replacement of expensive fire protection panels.

In another aspect, the present invention involves a method of securing panels of material at butt joints comprising the steps of removing a portion of material from said butt joint area between said planar surfaces of said panels; inserting a fastener comprising a binding bar having pointed barbs at each end of said binding bar, said barbs each directed substantially perpendicular to said binding bar and a stem fixably attached to said binding bar and directed away from said binding bar in the general direction said barb ends are directed; turning said fastener so that said barbed ends are positioned above said planar surface; applying force through means at said stem end to urge said barb ends into said planar surface to secure said panels from lateral movement.

Figure 4:
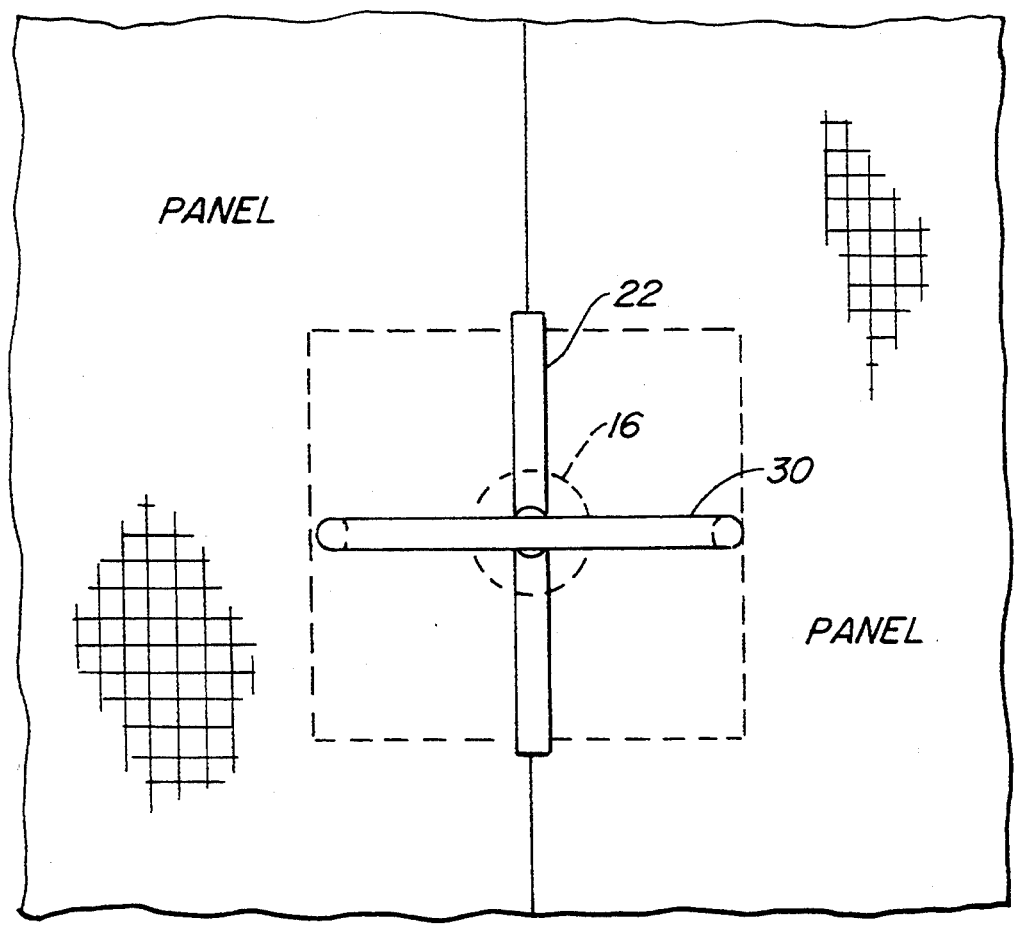
FIG. 4 is a top down view of an installed fastener at a panel joint.

To further describe the method of use and to install the fastener in a preferred environment, reference is made to the Figures. FIG. 3 shows a small diameter, preferably about a ¼" diameter hole 24 drilled through the butt joint at predetermined intervals. A sabre saw or the like is inserted into the small diameter hole to slot the hole each way along the joint, in a direction parallel the joint, as depicted in FIG. 4 by slot 22. A typical length in the preferred embodiment of the slot from the initial small hole is approximately ⅜" on either side. Care should be taken in practicing the method to use stops on the drill and the saw to prevent damage to cables. The method is particularly useful where ladder rungs are present above the panels, as the thickness of the ladder rungs at the bottom of the cable tray provides a measure of safety in providing space between the cables and the inner surface of the panels. In the next step of the method, the barbed-tee fastener is inserted through the slot until the barbs 26 on the ends of the binding bar 30 clear the inside surface 20. The fastener is thereafter preferably rotated about 90 degrees, then urged toward the surface 20 until barbs 26 engage and are forced into material 20. In the preferred embodiment providing for a washer 14 and threaded nut 16, when installed, the tightening of the nut will cause the barbs 26 to penetrate through the surface 20, which may be mesh fabric surface and into the panels proper. Other equivalent urging means, such as for example a slot and wedge pin will similarly enable the forcing of barbs 26 into the panel to secure the panels in place.

Figure 5:
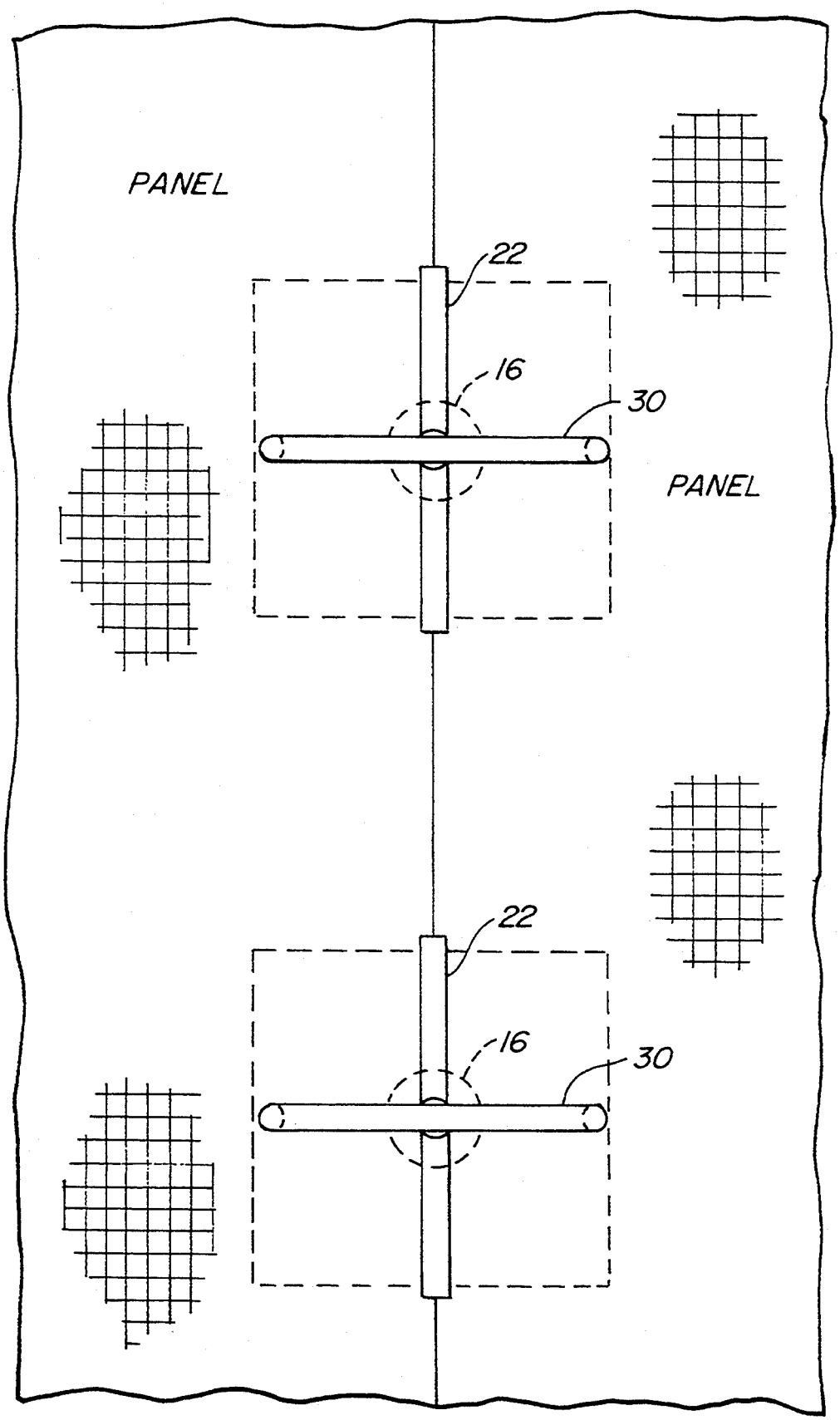
FIG. 5 is a top down view of a plurality of installed fasteners at a panel joint.

Several fasteners located along a butt-joint will prevent the panels from separating laterally under tension as shown in FIG. 5. The large washer 14 provided in the preferred embodiment will further hold the panels in the same plane at the joint. This tight joint effectively prevents intrusion of heat and flame into the interior of the cable tray.

In accordance with the present invention, vertical alignment of panels is maintained. By "vertical alignment", it is meant alignment in the direction perpendicular to the panel plane. Vertical alignment is paramount in the prevention of fire or other damaging elements from entering the zone protected by the panels.

Especially when the panels are Thermolag panels in, for example, a nuclear power plant, the panel properties are altered by heat. Indeed, Thermolag is designed to release a gas when heated to assist in the retarding of fires. When Thermolag panels are subjected to heat, prior to the present invention, adjacent panels would often "sag" in the vertical direction. Moreover, they would often sag at different rates. This would often cause an opening at the butt joint, allowing fire or other intrusion into the paneled zone. Among other factors, the present invention is useful in countering the above tendency for panels to sag in a fire.

EXAMPLE

The usefulness and value of the fastener of the present invention is further described in a specific example. Such an example, however, is intended only to better describe one embodiment of the invention, and does not in any way limit the invention as set forth below in the appended claims.

The following value calculations are based upon comparison with a proposed method of tying or stitching cable tray Thermolag Fire Barrier panels together at butt joints.

"Backfitting" or upgrading a cable tray comprising butt-jointed panels after installation by tying with stainless steel wire loops is the available technique, prior to the present invention, of securing the panels. The stitching and tying process involves removal of one panel to gain access into the enclosure in order to feed the inserted end of the wire back out through the free panel. Holes for the loops (3 to 5 pair per joint) would need to be predrilled. Damage to at least some of the panels removed is likely to occur. Damaged panels would therefore be required to be replaced with new stock.

In this particular example, a plurality of fasteners comprising a ¼" diameter stainless steel stem having threads at one end are used. At the opposing end of the stem is welded 1/16" diameter, 1¼" length rigid stainless steel wire, substantially perpendicular to the stem, and extending about ½" either side of the stem. At both ends of the rigid wire, the last ⅛" of the wire is caused to be directed back in a direction about parallel the stem. This constitutes the bar element to be inserted into the joint slot, as defined below.

To form a joint slot, a ¼" hole is drilled at five locations along a single butt joint between the two panels. The panels in this example are fire protection panels enclosing a cable tray in a nuclear power plant. After the small holes are completed, a sabre saw is fitted with a blade cutting about 1/16" wide path. The saw is fitted with stops such that the blade only extends from the guide plate the thickness of the panels, to avoid damaging cables and other material on the side opposite. Slots are formed in opposing direction along the butt joint from each of the five holes for a length from the hole of about ⅜".

Next, the fastener stem with accompanying "tee" head is inserted through the slot, having in this case first been fitted with a washer and threaded nut at the base of the stem. The washer and nut will serve as a "stop" to prevent the stem from being inconveniently lost into the cable tray. The nut, however, should preferably be threaded onto the stem only far enough to be engaged and retained on the stem, and not so far as to interfere with later positioning of the barbed tee.

Once the stem and barbed tee head are inserted, and the barb tips have been extended far enough to avoid the panels, the stem is turned. In this case, the stem is rotated in either direction about 90 degrees. This will provide the maximum retaining strength for holding the panels together at the joint. The tip is then engaged into the panel material only slightly enough to tend against further repositioning. The nut is then tightened against the washer and the underside of the panel. The barbs will be forced into the panel from the top, and indication the barbs have been fully inserted is given by a change in opposing force on the nut. This change is useful in the setting of automatic or pneumatic tools used in the installation process.

The procedure is repeated for each of the plurality of holes and slots at the butt joint to complete the joint securing method with the fastener of the present invention.

From the estimation of the use of the present invention, the installation of fasteners would require approximately 25% of the time to install wire loops and at substantially less cost. Further, labor and material with the fasteners would be less than about 10% relative to the stitch/tie method. This is further set forth with reference to Table 1 below.

TABLE 1

| Installation | Wire Loops | | Barbed Tee Fastener | |
|---|---|---|---|---|
| Labor 2 Men | 8–12 M/Hrs | $264.00 | 1–2 M/Hrs | $44.00 |
| Cost of Wire | (3) LF | 1.00 | — | 0.00 |
| Cost of Fasteners | — | 0.00 | 5 | 10.60 |
| Cost of Panel | (3) SQ FT | 180.00 | — | 0.00 |
| | | 445.00 | | 54.60 |
| Installation Time | 4–6 Hrs. | | 50 Min. | |

The 1992 cost of each fastener is estimated at $2.12.

The invention having now been described with reference to specific embodiments, other embodiments will be apparent to those of ordinary skill in the art. For example, the width or shape of the binding bar or stem elements may vary. Alternatively, the materials of construction for the device will be a matter of choice, and dependent upon the environment in which it is to be employed. It is therefore not intended that this invention be limited, except as indicated in the appended claims, along with the full scope of equivalence to which the claims are entitled.

Although the foregoing invention has been described in some detail by way of illustration and example, for purposes of clarity of understanding, it will be obvious that certain changes and modifications may be Practiced within the scope of the appended claims.

What is claimed is:

1. A panel system, comprising:
at least two panels, each panel having a top surface and an edge, wherein the panels are abutted adjacent each other along the edges with the top surfaces being generally aligned, and wherein the panels when abutting have a portion removed to define at least one elongate aperture near the edges;
at least one fastener including an elongate binding bar having first and second barbs, and a stem attached at a first end thereof to said binding bar at a position between said first and second barbs, said stem extending substantially perpendicular to said binding bar;
wherein the elongate aperture is sized sufficiently to allow the binding bar to pass therethrough, whereby the binding bar can be positioned against the top surfaces bypassing the bar through the elongate aperture from the bottom surfaces and rotating the binding bar about the stem, and wherein said stem is disposed in the aperture with one of said barbs extending into the top surface of one of the panels and another of the barbs extending into the top surface of the adjacent panel; and
means at a second end of said stem for urging said barbs into the top surfaces to secure the panels at the abutting edges.

2. The system as recited in claim 1, wherein said stem is formed with threads at the second end and wherein said urging means comprises a washer positioned around the second end of the stem and a nut threadably mated to said threads.

3. The system as recited in claim 1, wherein said bar is welded to said stem.

4. The system as recited in claim 1, wherein said bar is fabricated integral with said stem.

5. The system as recited in claim 1, wherein said barbs are directed away from said binding bar in a direction substantially perpendicular to said binding bar.

6. The system as recited in claim 1, wherein the aperture is centered between the abutting edges.

7. The system as recited in claim 1, wherein the panels when abutting define a plurality of elongate apertures between the edges, and wherein the system further comprises a plurality of fasteners extending from bottom surfaces of the panels through the plurality of apertures to the top surfaces, each of the fasteners having barbs extending into the top surfaces of the panels.

8. A panel system, comprising:
at least one fastener including an elongate binding bar having at least first and second barbs, and a stem attached at a first end thereof to said binding bar at a position between said first and second barbs, said stem extending substantially perpendicular to said binding bar;
at least two panels, each panel having a top surface, a bottom surface, and an edge therebetween, wherein the panels are abutted adjacent each other along the edges with the top surfaces being generally aligned, and wherein the panels when abutting have a portion removed to form at least one elongate slot between the edges, the elongate slot being sized sufficiently to allow the binding bar to pass therethrough, whereby the binding bar can be positioned against the top surfaces by passing the bar through the slot from the bottom surfaces and rotating the binding bar about the stem; and
wherein the stem extends through the slot with one of the barbs extending into the top surface of one of the panels and another of the barbs extending into the top surface of the adjacent panel; and
means at a second end of the stem for urging the barbs into the top surfaces to secure the panels at the abutting edges.

9. The system as recited in claim 8, wherein the panels define a plurality of elongate slots between the edges, and wherein the system further comprises a plurality of fasteners extending from the bottom surfaces through the plurality of slots to the top surfaces, each of the fasteners having barbs extending into the top surfaces of the panels.

10. The system as recited in claim 8, wherein said stem is threaded at the second end and wherein the urging means comprises a washer positioned around the second end of the stem and a nut threadably mated to the stem threads.

11. The system as recited in claim 8, wherein said bar is welded to said stem.

12. The system as recited in claim 8, wherein said bar is fabricated integral with said stem.

13. The system as recited in claim 8, wherein said barbs are directed away from said binding bar in a direction substantially perpendicular to said binding bar.

14. The system as recited in claim 8, wherein the slot is centered between the abutting edges.

* * * * *